Dec. 13, 1955    F. G. VON HOORN    2,727,110
TIME-DELAY MOTOR PROTECTIVE FUSE
Filed Dec. 22, 1953
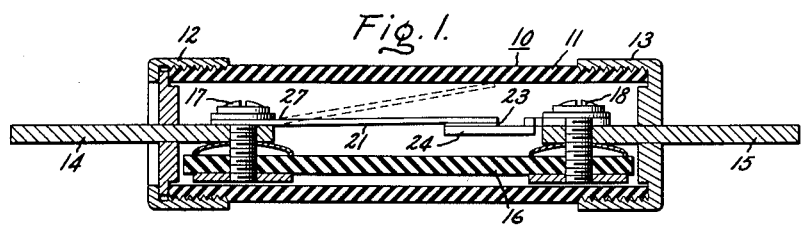
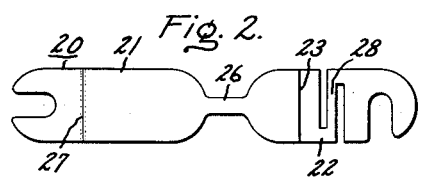
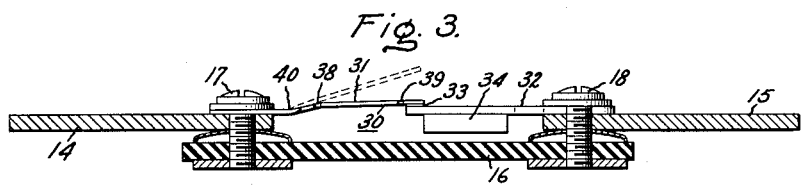
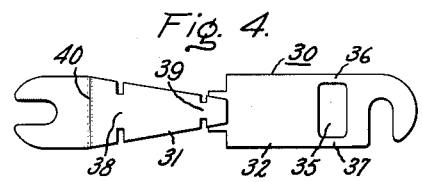
Inventor:
Fred G. von Hoorn,
by       Otto Kinopp
His Attorney.

United States Patent Office 2,727,110
Patented Dec. 13, 1955

2,727,110

TIME-DELAY MOTOR PROTECTIVE FUSE

Fred G. von Hoorn, Trumbull, Conn., assignor to General Electric Company, a corporation of New York Application December 22, 1953, Serial No. 399,785

5 Claims. (Cl. 200—117)

This invention relates to electric fuses and, in particular, to a new and improved time-delay fuse.

A fuse is a protective device which is placed in an electric circuit to open the circuit in the event of an excess of current due to a short circuit or a continuous overload. An ordinary fuse carries its rated amperage indefinitely, but the fuse will open the circuit if more than the rated amperage flows through it. For that reason, ordinary fuses often blow in a circuit including a motor when the motor is being started, because a motor which draws only 6 amperes while running may require as much as 30 amperes for a few seconds while starting. This starting current should not cause any fuse in the circuit to open the circuit because it is not injurious to the motor. The electric conductors which make up the circuit can safely carry their rated amperage continuously, depending on the diameter and material of the conductors, but they would be seriously damaged and possibly the source of a costly fire if more than the rated amperage flows through them continuously. These same conductors would not be damaged if the excessive current flowed only for a few seconds. For this reason, time-delay fuses have been produced for the protection of motor circuits. Such a fuse will open the circuit the same as an ordinary fuse on a small continuous overload or on a short circuit, but it will carry a large overload safely for a fraction of a minute. A time-delay fuse will prevent needless opening of the fuses during the starting of the motor.

In designing a new installation having circuits for the operation of motors, it is much more economical to install a time-delay fuse rather than an ordinary fuse. If an ordinary fuse is used, it is necessary for it to have a rating high enough to allow the high starting currents of the motor to be impressed on the circuit without the blowing of the fuse. Also, it is necessary that the conductors of the circuit as well as the disconnecting switch for the fuses of the branch circuits be large enough to continuously carry the high starting current. If a time-delay fuse is used instead of an ordinary fuse for the same motor circuit, the former may have a much smaller rating, in the order of one-half of the rating of an ordinary fuse. In addition, the disconnecting switch for the fuse, as well as the conductors that make up the circuit, may be of smaller sizes to accommodate only the smaller rating of the time-delay fuse. Since the elements that make up the circuit are of smaller physical sizes, they are naturally less expensive to make and to install thereby saving money on the first cost of new installations.

For example, a typical 5 H. P. motor has an ampere rating of 15.9 amp. and only a 50 amp. rated fuse of the ordinary type would be satisfactory for such a motor circuit. While at the same time, if a time-delay fuse were used, a 25 amp. rated fuse would be satisfactory. At the same time, the conductors in the motor circuit could be of such a size to carry only the 25 amp. of the time-delay fuse. Furthermore, with the ordinary 50 amp. fuse, a disconnecting switch rated at 60 amp. would have to be used instead of a less expensive 30 amp. switch that is necessary with the 25 amp. time-delay fuse.

A time-delay fuse also makes it possible to increase the usefulness of present facilities with perfect safety and with the elimination of needless blowing of the fuses. By using a time-delay fuse, it is possible to load an ordinary circuit up to capacity with motor operated devices and appliances and yet protect it with the same size time-delay fuse as an ordinary fuse. The long time lag of a time-delay fuse keeps it from opening on motor starting currents that would even open larger sizes of ordinary type fuses.

While time-delay motor protective fuses have heretofore been known, there is still need in the art for an improved fuse of this type.

It is an object of this invention, therefore, to provide a new and improved combination motor overload and short circuit interrupting fuse.

It is a further object of this invention to provide a new and improved fuse link adapted for motor use which may be installed in renewable fuse casings.

It is a still further object of this invention to provide a new and improved motor fuse of the circuit interrupting type wherein a portion of the fuse link is made of a spring material.

It is a still further object of this invention to provide a fuse link with an interrupter member of spring material having one or more restrictions therein such that a restriction will fuse before the spring is softened by an annealing temperature that might render the device inoperative.

Further objects and advantages of this invention will become apparent, and the invention will be more clearly understood from the following description taken in connection with the accompanying drawings, and the features of novelty which characterize this invention will be pointed out with particularity in the claims annexed to and forming a part of this specification.

Broadly, this invention relates to a link so constructed as to be in two portions; namely, a combined spring and fusing portion, and a mass portion which may also be a heater portion, secured together by a fusible metal having a low melting point. The present invention comprises a time-lag fuse link having a fusible section which opens the circuit when the circuit is shorted, which section is in the form of a spring strip having an outer deformation so that the strip is inherently biased away from and is soldered to a heat storage mass. This solder will melt if an excessive current due to an extended motor overloaded condition is impressed on the circuit and the spring strip will snap free to open the circuit. Spring strips have been used before in fuse links, but they either did not carry current or they were not fusible. In the latter case, separate fusible elements were required to interrupt the short circuit currents.

In the drawing:

Fig. 1 is a cross-sectional view of a new and improved motor fuse link assembly.

Fig. 2 is a top plan view of the fuse link of Fig. 1.

Fig. 3 is a side elevational view of the second modification of fuse link assembly.

Fig. 4 is a top plan view of the fuse link of Fig. 3.

Referring to Fig. 1 and Fig. 2 of the drawing, a fuse 10 is shown comprising a casing 11 of suitable insulating material having end caps 12 and 13 which position knife blades 14 and 15 respectively. Within the casing 11 a spacer bar 16 of insulating material is shown supported by a pair of spaced screws 17 and 18 and thereby secured to the knife blades 14 and 15. A fuse link 20 is also shown supported by the screws 17 and 18.

The structure above described is a renewable fuse wherein an end cap 12 may be unscrewed from the casing 11 whereupon the fuse structure comprising the knife blades 14 and 15 and spaced bar 16 and the fuse link 20 may be removed as a unit from the casing 11. When this has been done, the fuse link 20 may be removed from the knife blades. A more complete showing of a similar type of renewable fuse assembly is shown in the Von Hoorn Pat. No. 2,556,018 which is assigned to the same assignee as is the present invention.

The fuse link 20 comprises a spring portion or element 21 and a heater portion or element 22 which are joined by a low melting alloy or solder 23 where the elements overlap. The inner end of the heater element 22 has a larger mass than the outer end so that it acts as a heat absorbing mass means 24. The spring element 21 is preferably a beryllium-copper spring and fuse member combined having a narrow restriction 26 which will blow almost instantaneously at the time of the short circuit. The beryllium-copper spring 21 is further provided with a bend at a point 27 adjacent the inner end of the knife blade 14 to provide a deformity causing the spring normally to lift up out of alignment with the knife blades 14 and 15. This is a permanent distortion, and it is only when the spring element 21 is deflected to be in engagement with and soldered to the heat absorbing mass 24 that the spring will stay in alignment with the knife blades 14 and 15.

The heater element 22 is formed of Nichrome or other heater grids of similar types having at least one portion 28 of narrow cross-section whereby the flow of current through that portion 28, as well as through restriction 26, creates heat which is the motivating force for interrupting the motor circuit through the fuse. Specifically, the heat that is generated in the portion 28 is proportional to the current flowing through it. The generated heat at normal current load is such that it has no unusual effect on the overall temperature. However, at overload, the current passing through the portion 28 generates heat that passes into the heat storage terminal, namely, the knife blade 15. Furthermore, the generated heat passes into the mass 24 to prevent any immediate interruption of the circuit by the heat melting the solder 23. Rather, it is required that these heat absorbing masses 15 and 24 have their temperature raised before the melting of the solder will take place. For this reason, a time delay exists in the interruption of the fuse circuit. That is, until the mass 24 is raised to a temperature that will melt the solder 23, current will pass through the fuse circuit. By varying the cross-section of the portion 28 of the heater and restriction 26, the rating of the fuse can be changed within limits.

In operation, then, on motor overload the portion 28 of grid heater 22 has its temperature raised and transmits heat to adjacent heat storage masses such as the knife blade 15 and the mass 24. If this overload current is prolonged, the temperature of the solder 23 is raised to its melting temperature, thereby releasing the spring element 21 which takes the position shown by the dotted lines in Fig. 1 to open the fuse. By reason of the time lag in the heater and adjacent mass sections, motor starting current will not ordinarily cause the solder to melt. On short circuit, however, the beryllium-copper spring member serves as a fuse link which has a restriction 26 which will blow almost instantaneously to cause a gap in the link that breaks the circuit.

It is a common expedient in the fuse art to utilize a strip of spring metal that is provided with a deformation adjacent one of its ends and is soldered to a heat conducting member at its other end so that when the members are overheated, the solder will fuse and the spring strip will move out of position. The applicant's invention represents more than the mere substitution of a spring strip for one of the elements of a time lag fuse link. If such a simple substitution were made in a fuse assembly of the present invention and a current surge of slightly less magnitude or duration than that associated with overload or short circuit operation were passed through the fuse link, the excessive heat generated might destroy the essential spring quality of the spring strip thereby rendering the fuse inoperative. In the present invention, this unwanted condition is prevented by the unique arrangement of one or more restrictions in the spring member whereby a restriction will fuse before the annealing temperature is reached in the deformed area of the spring element.

Turning now to Fig. 2 of the drawing, it will be seen that the spring element 21 comprises a single restriction 26 which is adapted to blow on short circuit. The restriction 26 is nearer to the heat absorbing mass 24 and the heater portion 28 than to the deformation in the spring element. As a result, on moderately heavy overloads approaching short circuit magnitude, the restriction 26 will fuse before the annealing temperature of the spring is reached to destroy its spring action. Therefore, it is this combined spring element and fusing section which, in combination with the heater element, represents the present invention.

An improved modification of the fuse link 20 is shown as the link 30 in Fig. 3 and Fig. 4 which has a high current interrupting capacity. The fuse link 30 comprises a spring element 31 and a heater element 32 which are joined by a low melting solder 33 where the elements overlap. A heat absorbing mass 34 is welded to one side of the inner end of the heater element 32. A rectangular hole 35 is formed in the central portion of the heater element 32 to provide spaced connecting portions 36 and 37 of narrow cross-sections whereby the flow of current through said narrow sections generates heat which is the motivating force for interrupting the circuit through the fuse on motor overload. The spring element 31 is also a beryllium-copper spring and fuse member combined, but it has an outer restriction 38 and a relatively narrow inner restriction 39 adjacent the area where the solder 33 holds the elements together. As a result of the relative sizes of the restrictions 38 and 39, the outer restriction 38 is of lower resistance than the inner restriction 39. In addition, the spring element 31 is tapered from its outer end towards its inner end in order to increase the difference between the resistance of the inner end of the spring relative to the outer end of the spring. The spring element 31 is further provided with a bend at a point 40 adjacent the inner end of the knife blade 14 to provide a deformity causing the spring normally to lift up at an angle to the longitudinal axis of the knife blades. This is a permanent distortion, and it is only when the spring element 31 is deflected to be in engagement with and soldered to the inner end of the heater element 32 that the spring is arranged substantially in alignment with the knife blades.

In operation, the flow of current through the fuse link assembly produces heat at the narrow restrictions 36 and 37 of the heater element 32 which, upon overload, tend to heat up the heat absorbing mass 34 to provide for a time-delayed opening of the fuse. Specifically, the mass 34 must be heated before the solder 33 will fuse. In this manner, normal overload current during the starting of a motor will not open the fuse circuit, while a prolonged overload condition will heat the mass 34 and melt the solder to release the spring element 31 which snaps to the open circuit position shown by the dotted lines of Fig. 3. When the current is raised by a short circuiting condition, the restrictions 38 and 39 fuse out almost instantaneously, causing a wide gap which breaks the circuit. If the current surge is slightly less than the amount necessary to fuse the solder 33, the temperature within the spring element 31 will rise, but the high resistance restriction 39 which is adjacent the soldered connection between the elements will fuse before the annealing temperature of the spring is reached adjacent the deformity 40.

Of further note is the fact that more than one restriction is formed within the spring element 31 because of the present trend of designing fuses with high current interrupting capacity. More than one fusing section is provided so that they both will blow to drop the portion of the link structure between the restrictions completely out of the circuit thereby providing a high current interrupting capacity for the fuse.

Modifications of this invention will occur to those skilled in the art, and it is desired to be understood, therefore, that this invention is not intended to be limited by the particular embodiments disclosed but, rather, it is intended to cover all modifications which are within the true spirit and scope of this invention.

What I claim as new and desire to secure by Letters Patent of the United States is:

1. A fuse link comprising a heater section and a spring section, said heater section comprising an outer end portion for connection with a fuse terminal, a mass portion and an intermediate heater portion of small cross-section connected at its ends to said outer end portion and said mass portion, said spring section comprising a strip of spring metal having an outer end portion for connection with a fuse terminal, adjacent ends of said heater section and said strip of spring metal overlapping and being connected by a fusible metal, and said strip of spring metal being provided with a deformity adjacent its outer end portion whereby its inner end is biased away from said heater portion, said spring section further comprising at least one restriction located between the said deformation and the fusible connection which is adapted to fuse in the event of a short circuit condition, whereby on moderately heavy overloads approaching short circuit magnitude the restriction will fuse before the annealing temperature of the spring is reached.

2. In a fuse link structure, as recited in claim 1, wherein there are at least two restrictions in the spring section the innermost restriction being of smaller cross-section than the outer restriction.

3. In a fuse link structure, as recited in claim 2, wherein the said spring section is tapered down from its outer end towards its inner end.

4. A fuse link comprising a spring element and a heater element which are soldered together where the elements overlap, the inner end of the heater being of larger mass than the outer end to serve as a heat absorbing mass, the central portion of said heater element comprising a portion of narrow cross-section to serve as the heat generator, said spring element comprising a strip of spring copper having a deformation adjacent its outer end whereby its inner end is inherently biased away from said heater element, and further having at least two narrow restrictions which are adapted to fuse on short circuit, the innermost restriction being adapted to fuse before the spring is softened by a high annealing temperature.

5. A fuse link comprising a spring section and a mass section, connected by a fusible metal, said spring section comprising a strip of spring metal having an outer end portion for connection with a fuse terminal and a deformity intermediate its ends whereby the inner end is biased away from said fusible connection, said spring section further having a pair of restrictions between the said deformity and the fusible connection, the innermost restriction being of smaller cross-section than the outer restriction so that the inner restriction will fuse in the event of a moderately heavy overload approaching short circuit magnitude before the annealing temperature of the spring is reached.

References Cited in the file of this patent

UNITED STATES PATENTS

| | | |
|---|---|---|
| 1,792,299 | Green | Feb. 10, 1931 |
| 2,563,812 | Berthel | Aug. 14, 1951 |
| 2,667,551 | Berthel | Jan. 26, 1954 |

FOREIGN PATENTS

| | | |
|---|---|---|
| 605,439 | Great Britain | July 23, 1948 |
| 693,608 | Germany | July 16, 1940 |
| 968,991 | France | May 10, 1950 |